(12) United States Patent
Pallini, Jr. et al.

(10) Patent No.: US 8,226,089 B2
(45) Date of Patent: Jul. 24, 2012

(54) METAL-TO-METAL SEAL FOR SMOOTH BORE

(75) Inventors: Joseph W. Pallini, Jr., Tomball, TX (US); Rockford D. Lyle, Pinehurst, TX (US); Chii Ren Lin, Bellaire, TX (US)

(73) Assignee: Vetco Gray Inc., Houston, TX (US)

( * ) Notice: Subject to any disclaimer, the term of this patent is extended or adjusted under 35 U.S.C. 154(b) by 257 days.

(21) Appl. No.: 12/487,516

(22) Filed: Jun. 18, 2009

(65) Prior Publication Data

US 2009/0322030 A1 Dec. 31, 2009

Related U.S. Application Data

(63) Continuation-in-part of application No. 12/164,962, filed on Jun. 30, 2008, now Pat. No. 8,096,560.

(51) Int. Cl.
*F16L 17/06* (2006.01)

(52) U.S. Cl. ........ 277/607; 277/339; 277/608; 277/614; 277/615; 285/334.2; 285/341

(58) Field of Classification Search .......... 277/338, 277/339, 608, 614, 615, 607; 285/334.2, 285/341

See application file for complete search history.

(56) References Cited

U.S. PATENT DOCUMENTS

| | | | | |
|---|---|---|---|---|
| 591,828 A * | 10/1897 | Duncan | ............ | 285/339 |
| 909,029 A * | 1/1909 | Schmidt | ............ | 285/289.2 |
| 924,840 A * | 6/1909 | Schmidt | ............ | 285/334.2 |
| 2,766,999 A * | 10/1956 | Watts et al. | ............ | 285/334.2 |
| 3,325,176 A * | 6/1967 | Latham et al. | ............ | 277/614 |
| 3,507,506 A * | 4/1970 | Tillman | ............ | 277/614 |
| 3,749,426 A * | 7/1973 | Tillman, III | ............ | 285/336 |
| 4,214,763 A * | 7/1980 | Latham | ............ | 277/614 |
| 4,410,186 A * | 10/1983 | Pierce, Jr. | ............ | 277/318 |
| 4,470,609 A * | 9/1984 | Poe | ............ | 285/334.2 |
| 4,471,965 A * | 9/1984 | Jennings et al. | ............ | 277/322 |
| 4,563,025 A * | 1/1986 | Poe | ............ | 285/334.2 |
| 4,930,791 A * | 6/1990 | Ungchusri et al. | ............ | 277/607 |
| 5,039,140 A | 8/1991 | Szymczak | | |
| 5,058,906 A * | 10/1991 | Adamek et al. | ............ | 277/614 |
| 5,095,991 A | 3/1992 | Milberger | | |
| 5,103,915 A | 4/1992 | Sweeney et al. | | |

(Continued)

OTHER PUBLICATIONS

International Search Report and Written Opinion, International Application No. PCT/US2009/048591, dated Oct. 16, 2009.

*Primary Examiner* — Alison Pickard

(74) *Attorney, Agent, or Firm* — Bracewell & Giuliani LLP

(57) ABSTRACT

A seal assembly includes a tubular member having a longitudinal axis and a tubular member seal profile. A metal seal ring having a proximal base and a distal end has a seal ring seal profile between the proximal base and distal end that contacts the tubular member seal profile. A distal annular recess is in one of the seal profiles, the distal annular recess being spaced axially from the distal end of the seal ring, defining a seal surface between the distal end of the seal ring and the distal annular recess that engages a seal surface of the tubular member seal profile. The contacting portions of the seal surfaces form a metal-to-metal seal area. A proximal annular recess in one of the seal profiles is spaced axially from the distal annular recess, defining a support area axially spaced from the metal-to-metal seal area.

11 Claims, 7 Drawing Sheets

U.S. PATENT DOCUMENTS

| | | | | |
|---|---|---|---|---|
| 5,135,266 A | * | 8/1992 | Bridges et al. | 285/123.7 |
| 5,183,268 A | * | 2/1993 | Wong et al. | 277/328 |
| 5,211,226 A | | 5/1993 | Hendrickson et al. | |
| 5,464,063 A | * | 11/1995 | Boehm, Jr. | 166/382 |
| 5,466,018 A | * | 11/1995 | Stobbart | 285/334.2 |
| 5,839,765 A | * | 11/1998 | Carter et al. | 285/334.2 |
| 6,450,507 B2 | * | 9/2002 | Johnson | 277/612 |
| 6,561,521 B2 | * | 5/2003 | Janoff et al. | 277/603 |
| 6,722,426 B2 | | 4/2004 | Sweeney et al. | |
| 6,869,080 B2 | * | 3/2005 | Janoff et al. | 277/603 |
| 7,025,360 B2 | * | 4/2006 | Walker et al. | 277/652 |
| 7,819,439 B2 | * | 10/2010 | Paton et al. | 285/341 |
| 2001/0045711 A1 | | 11/2001 | Johnson | |
| 2003/0000694 A1 | | 1/2003 | Sweeney et al. | |
| 2004/0056432 A1 | * | 3/2004 | Walker et al. | 277/627 |
| 2007/0013146 A1 | * | 1/2007 | Gariepy | 277/608 |

* cited by examiner

US 8,226,089 B2

METAL-TO-METAL SEAL FOR SMOOTH BORE

CROSS-REFERENCE TO RELATED APPLICATION

This application is a continuation-in-part of parent application Ser. No. 12/164,962, filed Jun. 30, 2008 and entitled "Metal-to-Metal Seal for Smooth Bore".

FIELD OF THE INVENTION

This invention relates in general to subsea oil and gas well production, and in particular to a metal-to-metal seal for use in a tieback connector.

BACKGROUND OF THE INVENTION

Metal-to-metal sealing is commonly used in subsea hydrocarbon production assemblies. For example, subsea wells typically have a subsea wellhead assembly at the seafloor with a subsea production tree mounted on the wellhead assembly. The tree has valves connected to flowlines for controlling flow from the well. In another type of installation, a string of tieback conduit extends from the subsea wellhead assembly to a platform at the surface. A surface tree is mounted on the upper end of the tieback conduit. Some riser systems have inner and outer tieback conduits, each of which is run separately and connected by a tieback connector. The inner and outer tieback conduits make up the tieback riser in that type of system.

The inner tieback conduit is installed by connecting a tieback connector to the lower end of the conduit and lowering it into the bore of the subsea wellhead housing assembly. The tieback connector has a locking member that locks to the subsea wellhead housing or to the tapered stress joint at the bottom of the outer tieback conduit. The inner tieback connector also includes a seal between where the tieback connector lands onto the subsea wellhead assembly. The seal is preferably a metal-to-metal seal, and it seals to an internal component of the subsea wellhead housing assembly. Metal-to-metal seals have a variety of configurations. While many work well, improvements are desired.

SUMMARY OF THE INVENTION

The seal assembly includes a tubular member having a longitudinal axis and a tubular member seal profile. A metal seal ring having a proximal base and a distal end has a seal ring seal profile between the proximal base and distal end that contacts the tubular member seal profile. A distal annular recess is in one of the seal profiles, the distal annular recess being spaced axially from the distal end of the seal ring, defining a primary seal surface between the distal end of the seal ring and the distal annular recess. The seal surface engages a seal surface of the tubular member seal profile. The contacting portions of the seal surfaces form a primary metal-to-metal seal area.

A proximal annular recess is in one of the seal profiles and spaced axially from the distal annular recess, defining a support area axially spaced from the metal-to-metal seal area. The distal annular recess has an axial extent length that exceeds an axial extent length of the metal-to-metal seal area, measured along the axis of the tubular member.

Preferably, the proximal annular recess has an axial extent length, measured along the axis of the tubular member, that exceeds the axial extent length of the metal-to-metal seal area.

In the preferred embodiment, when viewed in an axial cross-section, each of the annular recesses forms a continuous curve from one edge to an opposite edge.

The support area on one of the seal profiles is in contact with part of the other of the seal profiles when exposed to a selected level of fluid pressure, but less compressive force exists between this part and the support area than at the metal-to-metal seal area. The support area contact does not necessarily form a metal-to-metal seal, particularly at lower pressure levels.

The distal annular recess may be in the seal ring seal profile or it may be in the tubular member profile. The proximal annular recess may be in the seal ring seal profile or in the tubular member seal profile. If the proximal annular recess is in the tubular member seal profile, an additional proximal annular recess may be formed in the seal ring seal profile opposite the proximal annular recess in the tubular member seal profile.

In one embodiment, the distal and proximal annular recesses are in the tubular member seal profile. The seal ring seal profile comprises a conical surface that is substantially straight from the metal-to-metal sealing area to the proximal annular recess in the tubular member seal profile.

DETAILED DESCRIPTION OF THE INVENTION

Figure 1:
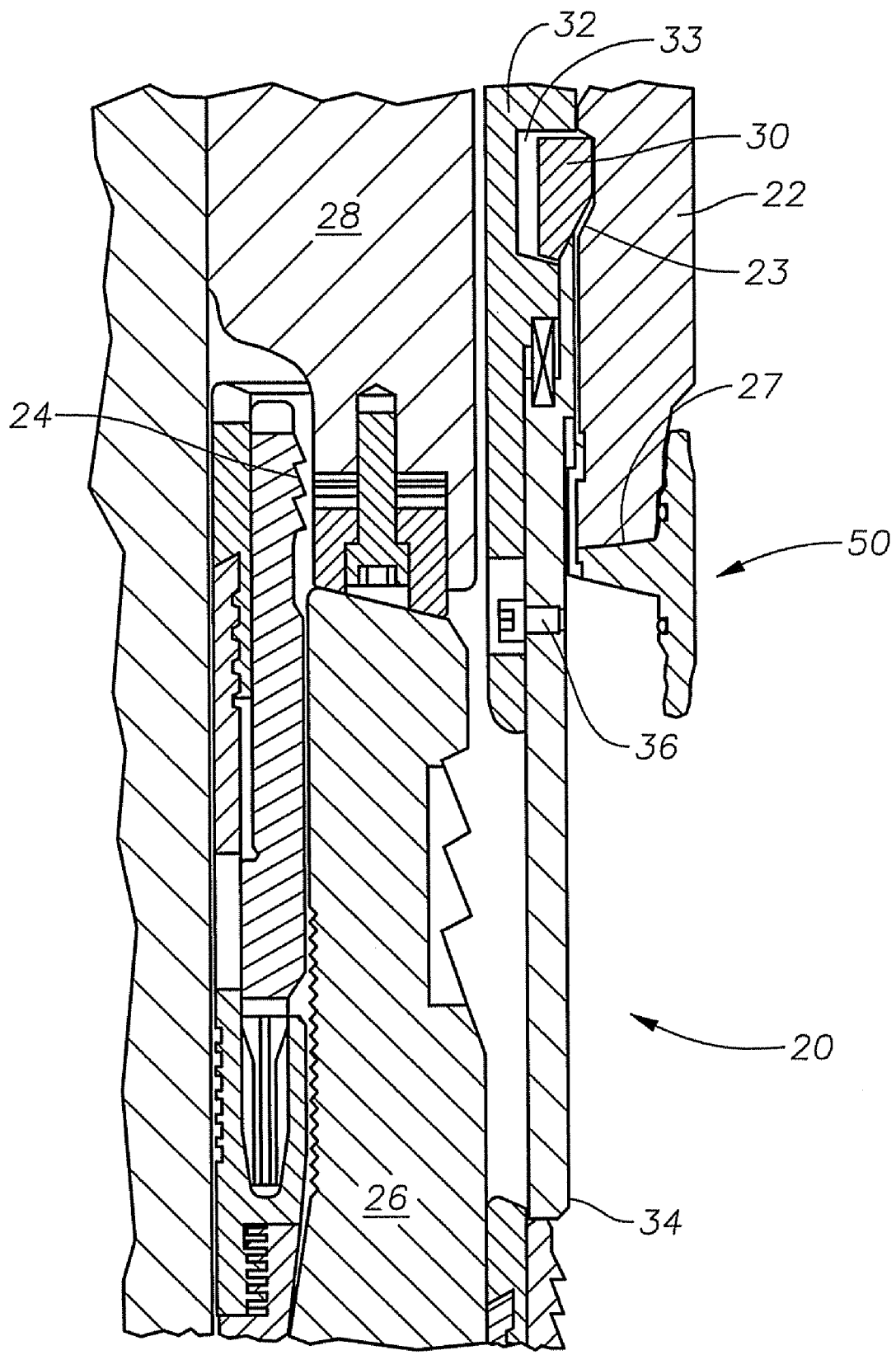
FIG. 1 is a sectional view illustrating a tieback connector, having a seal assembly, landing on a wellhead assembly.

Referring to FIG. 1, a tieback connector 20 for a subsea wellhead is illustrated in side cross-sectional view landing to a wellhead housing (not shown). The tieback connector 20 comprises a tubular mandrel 22, an actuator sleeve 34 circumscribing the mandrel 22 lower portion, a sleeve 32 formed around both the upper portion of the actuator sleeve 34 and the mandrel 22, and a casing hanger lockdown member 28 coaxially circling the sleeve 32. Opposing mating surfaces of the mandrel 22 and the sleeve 32 respectively include a mandrel groove 23 and a sleeve groove 33. As shown, these grooves 23, 33 are aligned with a split ring 30 extending into both the mandrel groove 23 and the sleeve groove 33. The mandrel 22 and the sleeve 32 are coaxially coupled by the presence of the split ring 30 within the grooves 23, 33.

Figure 2:
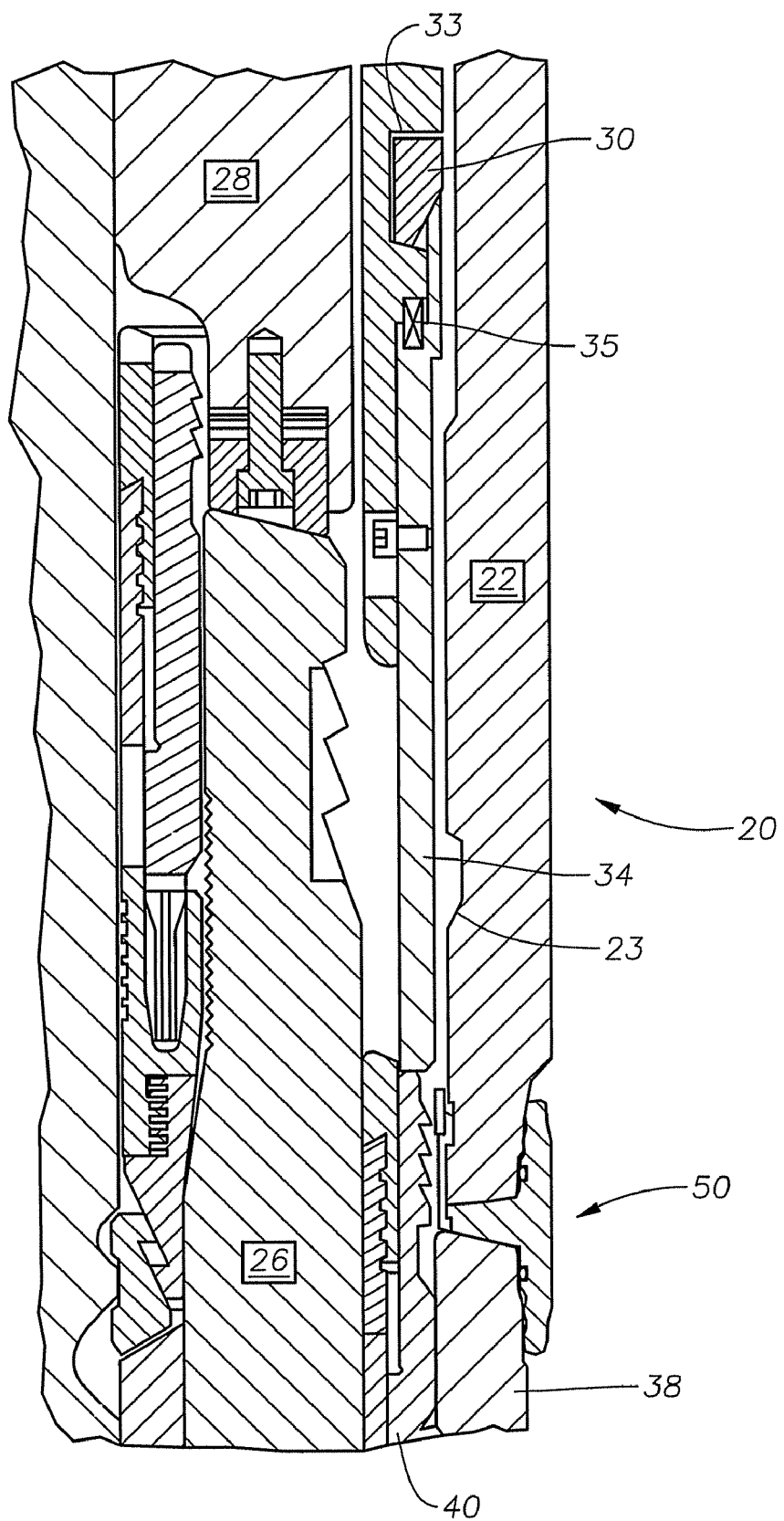
FIG. 2 is a sectional view illustrating the tieback connector of FIG. 1 in a landed position.
Figure 3:
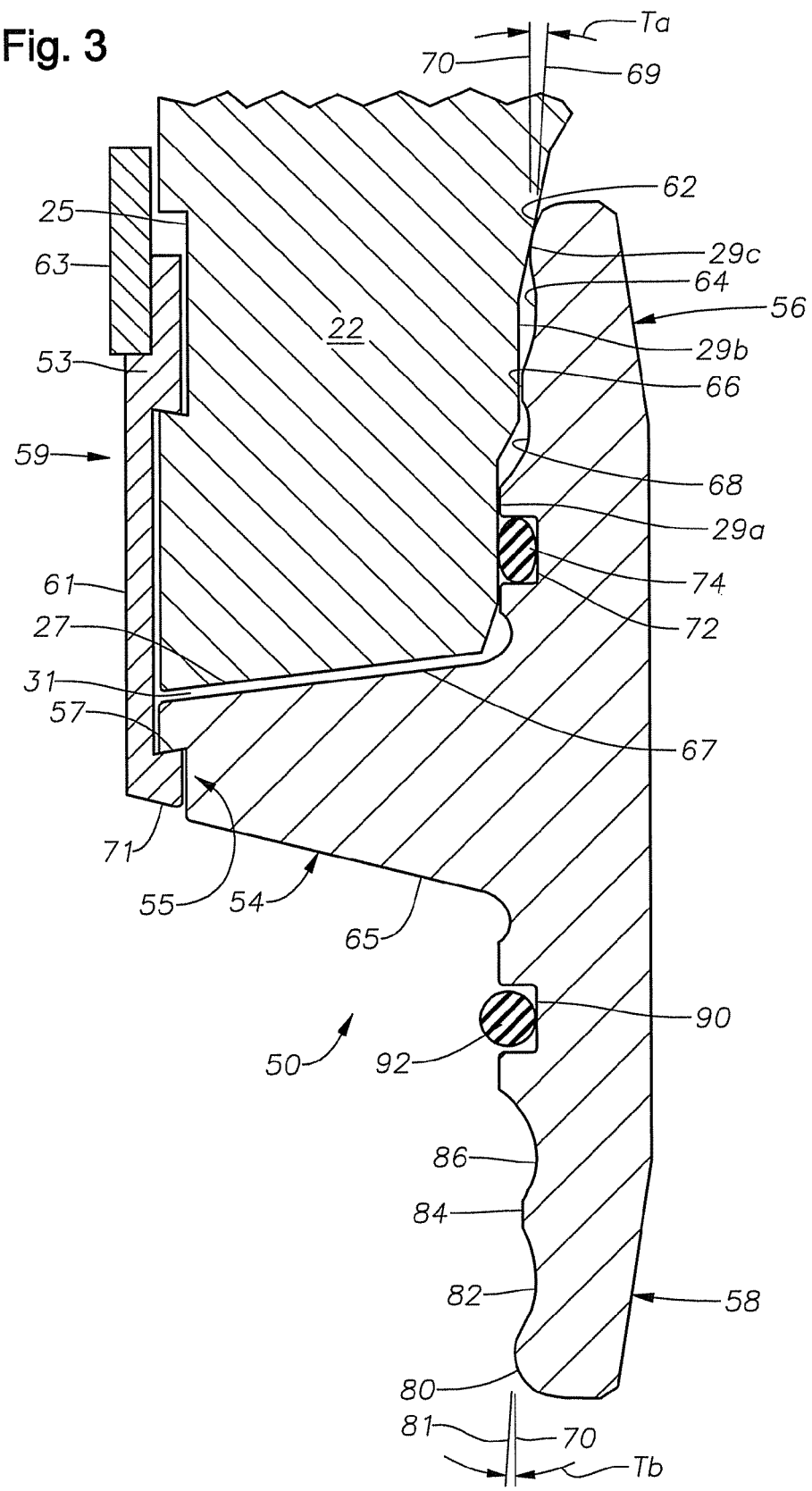
FIG. 3 is an enlarged sectional view of the seal assembly of FIG. 1.
Figure 4:
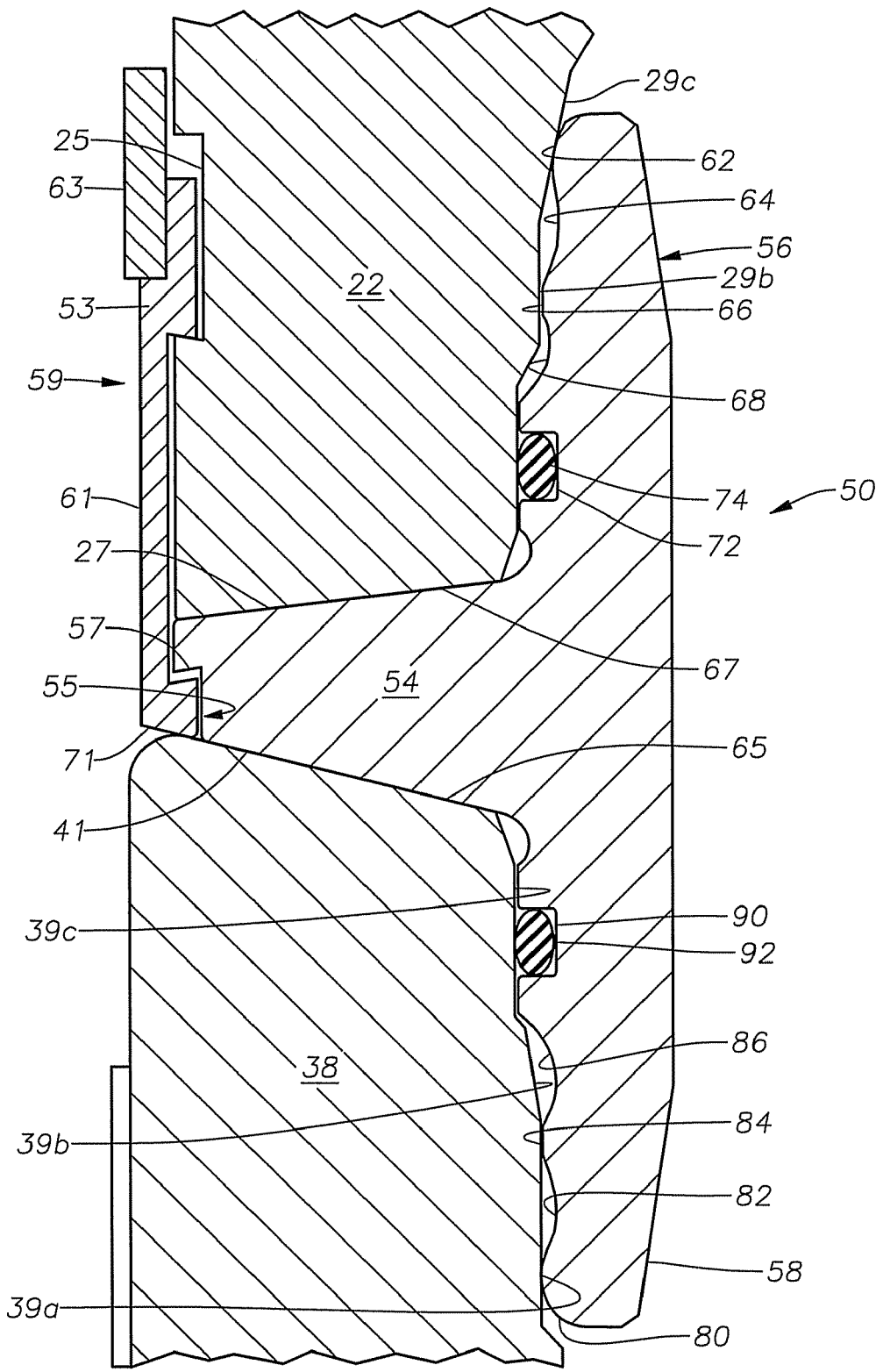
FIG. 4 is an enlarged sectional view of the seal assembly of FIG. 2.

The tieback connector 20 further includes a seal assembly 50 affixed to the lower end of the mandrel 22. FIGS. 1 and 3 illustrate seal 50 prior to energizing the seal 50. FIGS. 2 and 4 depict seal 50 in engagement with a casing hanger 38. With reference now to FIG. 3, an enlarged side cross-sectional view of the seal assembly 50 is illustrated. The seal assembly 50 comprises a metal seal member that may have an annular rib, base or web 54 on its outer side extending radially outward from its mid section and an upper leg 56 extending from the midsection substantially perpendicular to the web 54.

Optionally included is a lower leg 58 extending in an opposite direction from the upper leg 56. An outer surface of the upper leg 56 has portions in sealing contact with a lower terminal end of the mandrel 22. Although the mandrel 22 is shown as a part of the tieback connection 20, the seal assembly 50 can be coupled with any annular member and used for sealing there between.

Mandrel 22 preferably has a lower cylindrical sealing surface 29a, a central cylindrical or slightly conical support surface 29b and an upper conical sealing surface 29c. Lower cylindrical sealing surface 29a has a diameter, larger than central cylindrical support surface 29b and is separated by a conical transition area. Upper conical sealing surface 29c has a maximum diameter at its junction with support surface 29b.

Seal 50 is an annular member circumscribing a longitudinal axis of mandrel 22. An upper leg seal groove 72 is optionally formed on a cylindrical lower portion of the upper leg outer surface proximate to the web 54. An elastomeric seal 74, located in seal groove 72, is shown in cross-section and elastically deformed when pressed against lower cylindrical sealing portion 29a of the opposing sealing surface 29 of the mandrel 22. An undercut or annular recess 68 is formed into the upper leg outer surface beginning a short distance above groove 74. Recess 68 begins at a portion of seal 50 that may be considered to be part of a base of first leg 56, thus may be referred to as proximal recess 68. When viewed in the axial cross-sectional view of FIGS. 3 and 4, the recess 68 preferably has a continuously curved profile from its lower edge to its upper edge. In this example, the curved profile is formed at a single radius. The upper edge of proximal recess 68 terminates at a support area 66; which may be cylindrical and has a finite axial dimension or thickness. Support area 66 may contact but does not necessarily seal to mandrel central support surface 29b. If in contact after initial assembly, support area 66 would exert less force against upper tubular member 22 than sealing area 62. Support area 66 would contact central support surface 29b when fluid pressure is at the maximum level, but the contact would not be sufficient to form a metal-to-metal seal at the specified fluid pressure. The support area 66 axial extent or thickness is less than the axial extent or length of the undercut 68. The axial length is measured along the axis of mandrel 22.

A second upper leg undercut or annular recess 64 is formed in the upper leg 56 and since it is closer to the upper end of upper leg 56, it may be referred to as a distal recess. Undercut 64 begins at support area 66 and terminates at an upper leg outer sealing area 62. The sealing area 62 is formed proximate the tip of the upper leg 56, and as will be described below, provides a primary point of sealing contact between the seal assembly 50 and the mandrel 22 upper conical sealing area 29c. Undercut 64 is shown as having a larger radius and axial length than undercut 68, but variations are possible.

In the embodiment of FIG. 3, sealing area 62 has a curved generally conical cross-section, but other configurations are feasible. The diameter of the sealing area 62 is less than the support area 66 diameter. The axial dimension or length of undercut 64 is greater than the contacting portion of upper seal 62. The axial length of sealing area 62, which is the portion that contacts and seals against mandrel surface 29c, ranges from about 10% to about 50% of the first recess axial length.

Upper leg 56 deflects elastically when being installed on mandrel 22, with sealing area 62 deflecting radially inward slightly to form a metal-to-metal seal with sealing surface 29c. Support area 66 preferably deflects a very small amount compared to the deflection of sealing area 62. Prior to being installed on mandrel 22, a line 69 tangent to seal area 62 and support area 66 would be a small positive angle Ta relative to a vertical line 70 parallel with the axis of mandrel 22. After installation the taper angle Ta between lines 69 and 70 increases slightly. Prior to installation, taper angle Ta may be from about 8° to about 15°.

The embodiment of the lower leg 58 of FIG. 3 is similar to the upper leg 56 but some differences do exist in the embodiments shown. Lower leg 58 will sealingly engage a sealing surface in casing hanger 38. As shown in FIG. 4, the sealing area in casing hanger 38 includes a lower cylindrical surface 38a, a conical transition area 39b and an upper cylindrical surface 39c. Upper cylindrical surface 39c is larger in diameter than lower cylindrical surface 39a. Upper cylindrical surface 39c and lower cylindrical surface 38a could be slightly conical, if desired.

The lower leg 58 optionally includes a cylindrical portion on its outer surface with a base portion having a seal groove 90 and an elastomeric O-ring seal 92 that seals to upper cylindrical surface 39c. The lower leg 58 also includes third and fourth recesses or undercuts 82, 86 separated by a support area 84. Recess 86 begins at what may be considered to be part of the base of second leg 58. Support area 84 may contact but does not necessarily seal to lower cylindrical surface 39a. Support area 84 exerts less force against casing hanger 38 than second sealing area 80. In this example, the lower undercut 82 and the upper undercut 84 have about the same axial lengths and radii, but the lower undercut 82 is shallower. Sealing area 80 on the lower leg 58 is proximate to the lower leg tip and optionally may have a rounded cross-section. Sealing area 80 sealingly engages casing hanger cylindrical surface 39a. The axial length of each undercut 82, 84 is greater than the axial thickness of support section 84 and the axial length of the contacting portion of sealing area 80.

One of the differences between the lower leg 58 and the upper leg 56 is the difference between the initial upper taper angle Ta and a lower taper angle Tb. Lower taper angle Tb is the initial angle, prior to installation, between a tangent line 81 and vertical line 70, which is parallel with the axis of casing hanger 38. The tangent line 81 is tangent to support area 84 and lower sealing area 80. Lower taper angle Tb is a reverse taper relative to vertical line 70 from upper taper angle Ta. Sealing area 80 has an outer diameter slightly greater than the diameter of casing hanger cylindrical surface 39a. When sealing area 80 is forced against casing hanger cylindrical surface 39a, lower leg 58 elastically deflects inward, thereby decreasing taper angle Tb. Angle Tb decreases during installation, and prior to installation is preferably no greater than about 2 degrees.

The web 54 has a generally frusto-conical cross section, its width decreasing from the body 52 mid section to the web 54 crown 55. The crown 55 outer surface is profiled to form a ridge 57 along the crown's 55 outer circumference in this example. In this embodiment, the web 54 upper surface 67 and lower surface 65 are not parallel. These surfaces 65, 67 may have the same angle with respect to the axis of seal 50, or can have different angles as shown. In another embodiment, the surfaces 65, 67 may be generally parallel with each other, resulting in a near uniform thickness of rib 54. A retainer assembly 59 engages the ridge 57 for retaining the seal assembly 50 on the lower end of the mandrel 22. The retainer assembly 59 comprises a clip 61 having an elongated body with an inwardly protruding lip 71 on its lower end. The lip 71 mates with the ridge 57 and supports the seal assembly 50 on the mandrel 22. At this stage the seal assembly 50 is only partially in sealing engagement with the mandrel 22, thus a gap 31 remains between the mandrel 22 lower terminal surface 27 and the web 54 upper surface 67. The upper end of the clip 61 includes a base 53 wedged into a channel 25 formed on the mandrel 22 outer radial surface. An annular ring 63 circumscribes the outer portion of the base 53 for slidingly retaining it within the channel 25. Other retainers are feasible.

With reference now to FIG. 2, the tieback connector 20 is shown landed on the wellhead housing and in contact with inner or second casing hangar 38. The seal assembly 50 is wedged between the lower terminal end 27 (FIG. 4) of the mandrel 22 and the upper terminal end 41 of the second casing hangar 38. In this embodiment the mandrel 22 has been uncoupled from the sleeve 32 and traveled downward with respect to the sleeve 32. Uncoupling the sleeve 32 from the mandrel 22 involves using the activation sleeve 34 to urge the split ring 30 into an open space at the back end of the recess 33. The activation sleeve 34 upper end engages a profiled portion on the split ring 30 lower end to slide it out of the mandrel groove 23 permitting axial sliding of the mandrel 22 with respect to the sleeve 32. Alternatively, mandrel 22 could have a threaded engagement with sleeve 32 that causes it to move between the portion of FIG. 1 and the portion of FIG. 2 by rotation of the mandrel 22.

An enlarged view of the seal assembly 50 wedged between the mandrel 22 and the casing hangar 38 is provided in a cross-sectional view in FIG. 4. During landing, lower seal leg 58 will stab into casing hanger cylindrical portion 38a with straight downward movement. Seal area 80 elastically deflects and forms a sealing engagement with cylindrical portion 38a. Then, in this example, the operator rotates mandrel 22, which will rotate relative to seal 50. The rotation causes mandrel 22 to advance downward slightly relative to seal 50, causing gap 31 to close as mandrel lower surface 27 contacts web 54 upper surface 67. The downward movement of mandrel 22 also engages the upper leg sealing area 62 with mandrel sealing surface 29c. This engagement bends the upper leg 56 elastically toward the axis, thereby forming a stress area between the seal area 62 and the sealing surface 29c to energize the seal assembly 50.

Internal pressure acts against seal 50 to apply an internal force on seal areas 62 and 80, which is reacted by casing hanger seal surface 39a and mandrel sealing surface 29c. Internal pressure may also cause support areas 66 and 84 to contact mandrel surface 29b and casing surface 39a, respectively. This contact is not necessarily a sealing contact, however, and the contacting force under pressure is less than the forces imposed by the sealing areas. If the pressure is high enough, the contact may result in sealing, but this is not necessary. Strategically positioning the support area 66 on the sealing surface, in combination with the curved undercuts 64, 68, provides a means for controlling the sealing stress value between the sealing area 62 and the sealing surface 29c when energizing the seal assembly 50. A significant increase in sealing stress is achievable using the control means, wherein the maximum sealing stress is maintained below the yield point of the respective materials of the mandrel 22 and the seal 50. Additionally, controlling the stress at the sealing area 62 also insures other high stress points in the seal 50 will not exceed their respective yield values. The support areas 66 and 84 provide stiffening of legs 56, 68 against internal pressure loads. It is well within the capabilities of those skilled in the art to form seal legs having appropriately dimensioned undercuts, supports, and seal areas to achieve the desired results described herein.

The angled upper and lower surfaces 67, 65 of the web 54 comprise an additional feature of the seal assembly 50. The corresponding lower terminal end 27 of the mandrel 22 and the upper terminal end 41 of the casing hangar 38 are correspondingly angled to match the upper and lower surface contours. A lateral force exerted to the exterior of either the mandrel 22 or the casing hangar 38 is transferred to the other annular member via the wedge shaped web 54. This force transfer effectively couples the members together, thereby resisting lateral movement of one member with respect to the other.

Figure 5:
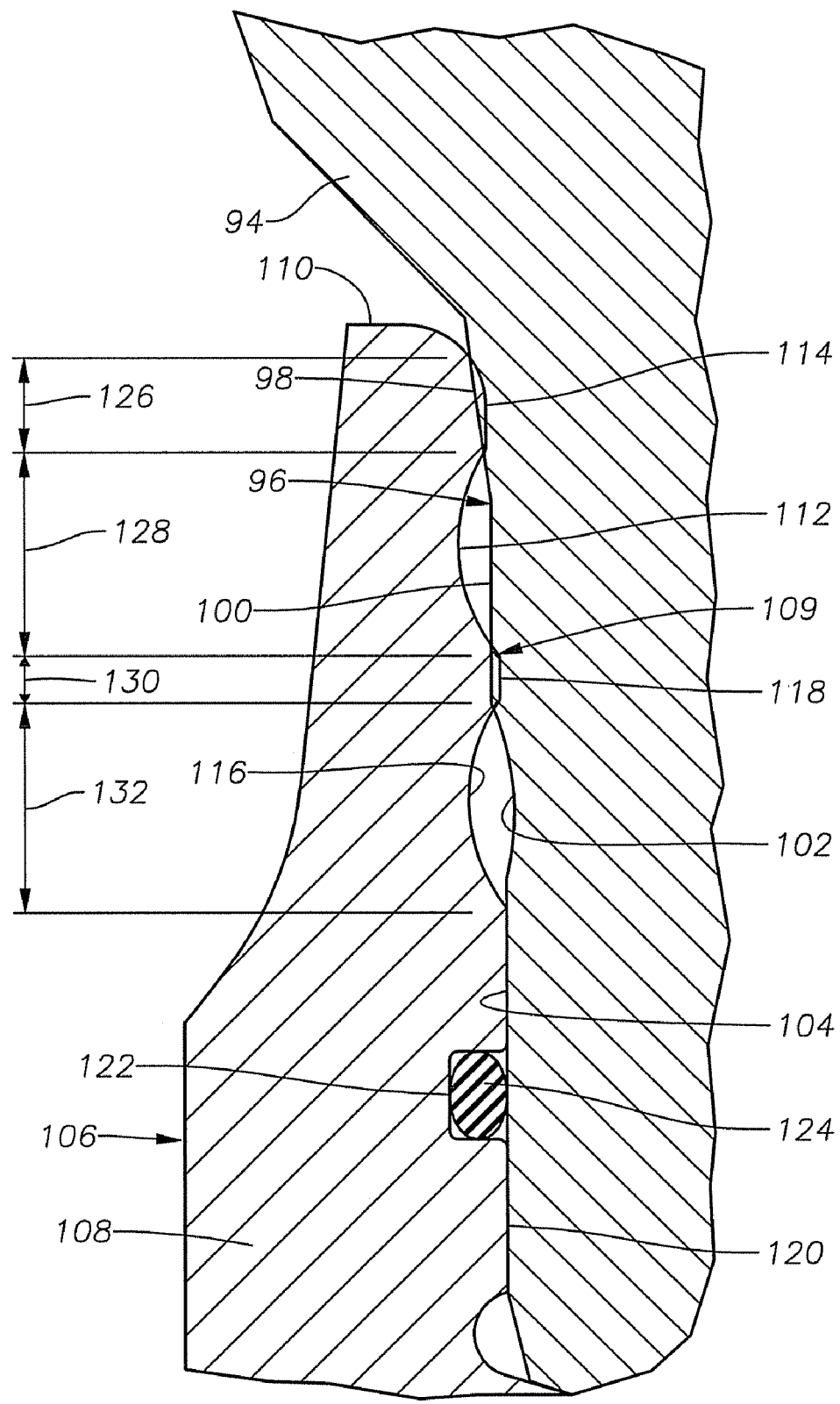
FIG. 5 is a sectional view of an alternate embodiment of the seal assembly of FIG. 4.

A second embodiment of a seal assembly is illustrated in FIG. 5. A tubular member 94, which may be similar to mandrel 22 or casing hanger 38 of the first embodiment or another tubular member, has a seal profile 96 on its inner diameter. Seal profile 96 has a primary seal area 98 that in this embodiment is a conical surface at the upper end of seal profile 96. In this example, a cylindrical surface 100 extends downward from primary seal area 98. An annular recess 102, referred to herein as a proximal recess, is formed at the lower end of cylindrical surface 100. Proximal recess 102 is preferably formed as a continuous curve when viewed in the axial cross-section shown in FIG. 5. A cylindrical surface 104 extends downward from proximal recess 102. Cylindrical recess 104 is slightly larger in inner diameter than cylindrical surface 100. Cylindrical surfaces 100 and 104 could alternately be conical surfaces.

A seal ring 106 has a base 108, a distal end 110, and a seal profile 109 extending between base 108 and distal end 110. In this example, base 108 could be an end of seal ring 106 opposite distal end 110. Alternately, base 108 could comprise a mid-section between two distal ends if the seal ring had two legs, such as the seal ring shown in the first embodiment. A web, such as web 54 of the first embodiment, could extend laterally from base 108. Distal end 110 is shown above base 108 in the example of FIG. 5, but it would be located below base 108 if seal 106 were inverted. The terms "upper" and "lower" are used merely for convenience. The terms "proximal" and "distal" are used to describe features located closer to or farther from base 108.

Seal ring 106 has a seal ring sealing profile 109 on its outer diameter that engages tubular member seal profile 96. A distal recess 112 has its upper edge spaced a selected distance below distal end 110, defining a primary seal area 114. Distal recess 112 is preferably in the configuration of a continuous single curve from its upper edge to its lower edge. Primary seal area 114 engages tubular member primary seal area 98 to form a primary metal-to-metal seal. The overlapped portion shown in FIG. 5 of primary seal area 114 and primary seal area 98 illustrates how much deflection or preload is required of seal ring 106 when it is installed. Seal profile 109 deflects to the left as shown in FIG. 5 when it is installed by an amount equal to the overlapped lines shown in FIG. 5. In this embodiment, seal primary seal area 114 is slightly rounded but it could have other shapes.

A seal proximal recess 116 is spaced a distance below seal distal recess 112, resulting in an annular support area 118 between them. In this embodiment, annular support area 118 is a cylindrical surface, but it could be tapered. Seal proximal recess 116 has approximately the same curved configuration as seal distal recess 112 and is located directly opposite tubular member proximal recess 102. Seal proximal recess 116 is located closer to base 108 than seal distal recess 112.

When seal ring 106 is initially installed in tubular member 94, optionally, a portion of support area 118 will contact a portion of tubular member cylindrical surface 100. The overlapped lines in FIG. 5 illustrate that some deflection may take place of support area 118 when seal ring 106 is initially installed. However, this deflection, if it occurs, is not necessarily sufficient to form a metal-to-metal seal, unlike primary seal area 114. There would be less preload compressive force initially between support area 118 and cylindrical surface 100 than primary seal areas 114 and 98. If there is no initial contact between support area 118 and cylindrical surface 100, when later exposed to the specified pressure within tubular member 94, seal ring 106 may deflect further, causing support area 118 to contact cylindrical surface 100, but the contact force between support area 118 and cylindrical surface 100 will be less than the contact forces between primary seal areas 98 and 114.

A cylindrical surface 120 extends from proximal recess 116 into base 108. Cylindrical surface 120 could alternately be conical. An optional seal groove 122 is formed in cylindrical surface 120 in this example. An elastomeric seal 124 locates within seal groove 122 and seals against tubular member cylindrical surface 104. Elastomeric seal 124 serves as a backup seal to the metal-to-metal seal formed by seal areas 98 and 114. Contacting portions of primary seal areas 98 and 114 have an axial extent or length 126 measured along a longitudinal axis of seal ring 106 and tubular member 94. Distal recess 112 has an axial extent 128 that is greater than axial extent 126. Support area 118 has an axial extent 130 that is less than primary seal axial extent 126 in this example. Proximal recesses 102 and 116 have an axial extent 132 that in this example is about the same as axial extent 128 and greater than axial extents 126 and 130.

When seal ring 106 is installed in tubular member 94, liquid would be present if it is a tieback seal arrangement as in the first embodiment. Liquid would tend to be trapped in distal recess 112 and proximal recesses 102 and 116 as seal ring 106 and tubular member 94 move axially relative to each other. Proximal recess 102 reduces the possibility of hydraulic lock occurring as elastomeric seal 124 and metal-to-metal seal areas 98 and 114 slide into engagement with each other.

Figure 6:
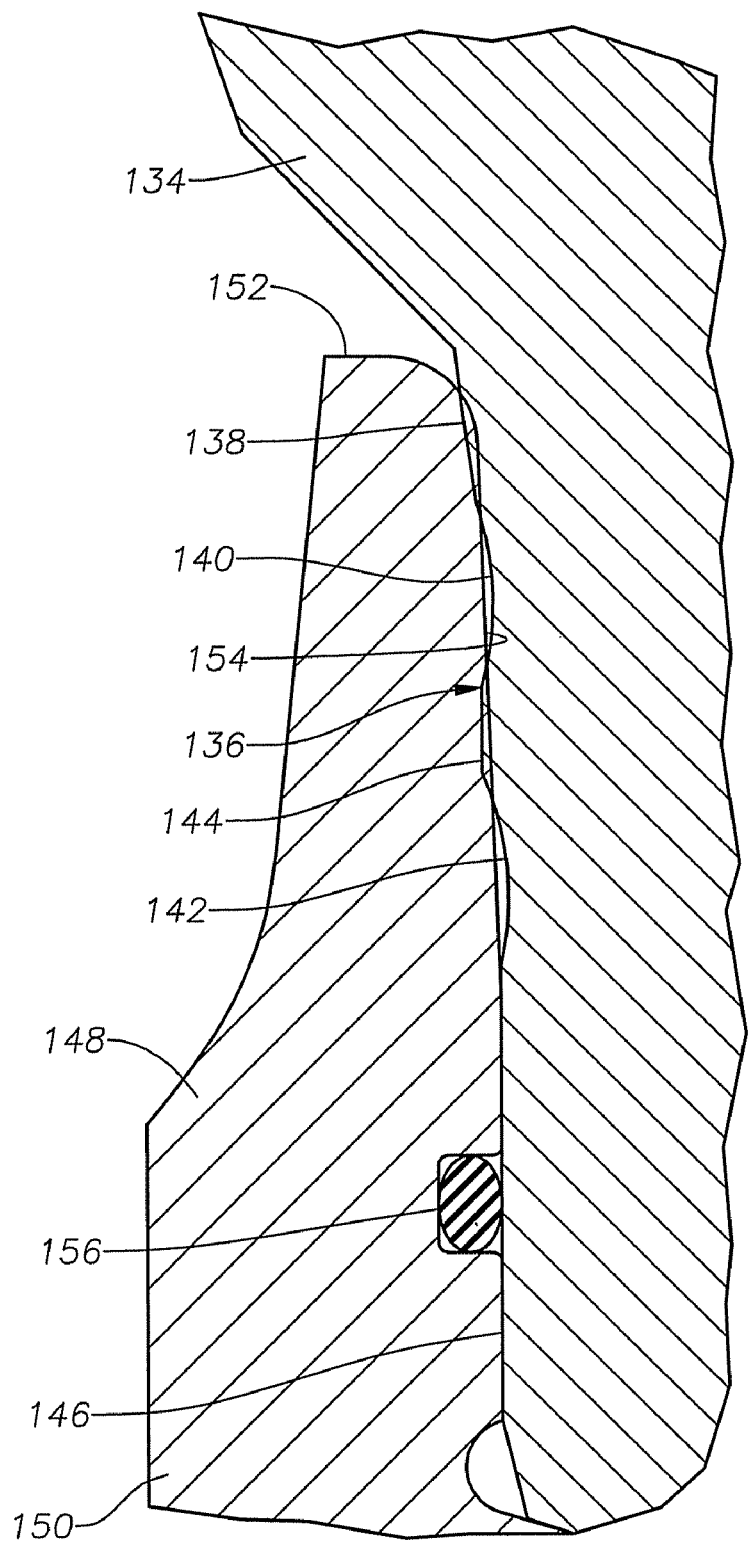
FIG. 6 is a sectional view of another alternate embodiment of the seal assembly of FIG. 4.
Figure 7:
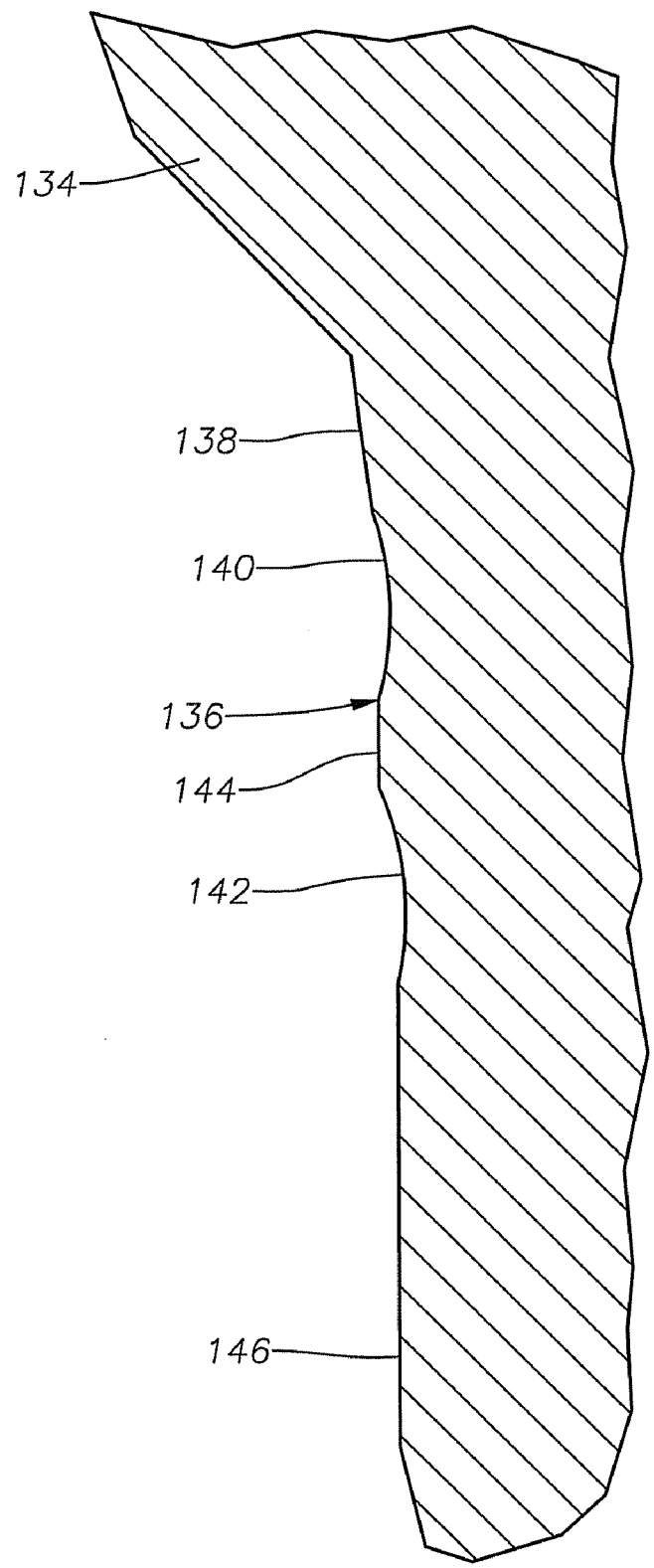
FIG. 7 is an enlarged sectional view of the mandrel portion of the seal assembly of FIG. 6.

FIGS. 6 and 7 illustrate another alternate embodiment of a seal assembly. Referring more particularly to FIG. 7, tubular member 134 could be either mandrel 22 or casing hanger 38 of the first embodiment or a tubular member for other purposes. Tubular member 134 has a seal profile 136 on its inner diameter that includes a conical surface 138 at the upper end of tubular seal profile 136. Alternately, conical surface 138 could be cylindrical. A distal recess 140 is formed in seal profile 136 at the lower edge of conical surface 138. As in the other embodiments, distal recess 140 is annular and preferably a continuous curve from its upper edge to its lower edge. A proximal recess 142 is located in seal profile 136 a selected axial distance below distal recess 140. Proximal recess 142 has approximately the same configuration and axial extent as distal recess 140. An annular support area 144 is located between distal recess 140 and proximal recess 142. Support area 144 may be cylindrical or slightly conical. The axial extent of support area 144 is less than either of the recesses 140 or 142. A cylindrical surface 146 extends downward from proximal recess 142. Cylindrical surface 146 could alternately be slightly conical.

Referring to FIG. 6, seal ring 148 has a base 150 and a distal end 152. Seal ring 148 has a seal profile 154 on its outer surface that engages seal profile 136 of tubular member 134. In this embodiment, seal profile 154 is a smooth surface, free of any recesses except for an optional seal groove that contains an elastomeric seal ring 156. The portion of seal profile 154 containing elastomeric seal ring 156 may be cylindrical or slightly conical. The portion of seal profile 154 beginning at the lower end of proximal recess 142 to approximately distal end 152 is a straight conical surface when viewed in the axial cross-section shown in FIG. 6. The overlapped lines in FIG. 6 illustrate that the primary metal-to-metal seal surface will exist at conical surface 138. Support area 144 may be contacted by a portion of seal profile 154. As in the other embodiments, support area 144 does not necessarily form a metal-to-metal seal.

While the invention has been shown in a few forms, it should be apparent to those skilled in the art that it is not so limited but susceptible to various changes without departing from the scope of the invention. For example, the lower seal leg could be mounted to a seal ring having a considerably different upper seal leg than shown, and vice-versa. Also, in the first embodiment, the upper seal leg is configured to allow rotation between the mandrel and the upper seal leg prior to full setting, but this not need be the case. A seal with only a single seal leg and no rib or web is also feasible, particularly if the seal is formed as a lip on a sleeve. The clip for retaining the seal member during deployment could be replaced with a threaded fastener.

The invention claimed is:

1. A seal assembly, comprising:
   a tubular member having a longitudinal axis and a tubular member seal profile;
   a metal seal ring having a proximal base and a distal end, the seal ring having a seal ring seal profile between the proximal base and distal end that is a straight conical surface;
   a distal annular recess in the tubular member seal profile, defining a seal surface that is engaged by a distal portion of the conical surface, forming a metal-to-metal seal area;
   a proximal annular recess in the tubular member seal profile and spaced axially from the distal annular recess, defining a support area axially spaced from the metal-to-metal seal area and contacted by a support portion of the conical surface between the proximal base and the distal portion; and
   wherein the distal annular recess has an axial extent length that exceeds an axial extent length of the metal-to-metal seal area measured along the axis of the tubular member.

2. The seal assembly of claim 1, wherein the proximal annular recess has an axial extent length, measured along the axis of the tubular member, that exceeds the axial extent length of the metal-to-metal seal area.

3. The seal assembly of claim 1, wherein when viewed in an axial cross-section, each of the annular recesses forms a continuous curve from one edge to an opposite edge.

4. The seal assembly of claim 1, wherein less compressive force exists between the support portion and the support area than at the metal-to-metal seal area.

5. A seal assembly, comprising:
   a tubular member having a longitudinal axis and a tubular member seal profile;
   a metal seal ring having a proximal base and a distal end, the seal ring having a seal ring seal profile between the proximal base and distal end that contacts the tubular member seal profile;
   a distal annular recess in one of the seal profiles, the distal annular recess being spaced axially from the distal end of the seal ring, defining a seal surface between the distal end of the seal ring and the distal annular recess that engages a seal surface of the tubular member seal profile, the contacting portions of the seal surfaces forming a metal-to-metal seal area
   a proximal annular recess in one of the seal profiles and spaced axially from the distal annular recess, defining a support area axially spaced from the metal-to-metal seal area;

wherein the distal annular recess has an axial extent length that exceeds an axial extent length of the metal-to-metal seal area measured along the axis of the tubular member;
wherein:
the distal annular recess is in the seal ring seal profile;
the proximal annular recess is in the tubular member seal profile; and
an additional proximal annular recess is formed in the seal ring seal profile opposite the proximal annular recess in the tubular member seal profile.

6. A seal assembly, comprising:
a tubular member having a longitudinal axis and a tubular member seal profile having a conical primary seal area and a cylindrical support area joining the primary seal area;
a metal seal ring having a base, a distal end, and a seal ring seal profile between the base and distal end that engages the tubular member seal profile;
a distal annular recess in the seal ring seal profile, the distal annular recess being spaced axially from the distal end of the seal ring, defining a seal surface between the distal end of the seal ring and the distal annular recess that engages the primary seal area of the tubular member seal profile, forming a metal-to-metal seal area;
a proximal annular recess in the seal ring seal profile and spaced axially from the distal annular recess, defining a support area axially spaced from the metal-to-metal seal area for contact with the support area of the tubular member seal profile; and
the support area on the seal ring seal profile being in contact with the support area of the tubular member seal profile when exposed to a selected level of fluid pressure, but less compressive force exists between the support areas than at the metal-to-metal seal area.

7. The seal assembly according to claim 6, further comprising an additional proximal annular recess in the tubular member seal profile opposite the proximal annular recess in the seal ring seal profile.

8. A seal assembly, comprising:
a tubular member having a longitudinal axis and a tubular member seal profile;
a metal seal ring having a base, a distal end, and a seal ring seal profile between the base and the distal end that engages the tubular member seal profile;
a distal annular recess in the seal ring seal profile, spaced axially from the distal end of the seal ring, defining a seal surface between distal end of the seal ring and the distal annular recess that contacts a seal surface of the tubular member seal profile, the contacting portions of the seal surfaces forming a metal-to-metal seal area;
a proximal annular recess in the seal ring seal profile and spaced axially from the distal annular recess, defining a support area between the distal and proximal annular recesses, wherein when the seal ring is exposed to fluid pressure at the selected level, the support area contacts a portion of the tubular member seal profile but exerts less force than the contacting portions of the seal surfaces forming the metal-to-metal seal area; and
an additional proximal annular recess in the tubular member seal profile opposite the proximal annular recess in the seal ring seal profile.

9. The seal assembly of claim 8, wherein the distal annular recess and each of the proximal annular recesses have an axial extent length that exceeds an axial extent length of the metal-to-metal seal area, the axial extent lengths being measured along the axis of the tubular member.

10. The seal assembly of claim 8, wherein when viewed in an axial cross-section, each of the annular recesses forms a continuous curve from one edge to an opposite edge.

11. A seal assembly for sealing against a tubular member, comprising:
a metal seal ring having a base, a distal end, and a seal ring seal profile between the base and distal end that is positioned to engage the tubular member;
a seal ring distal annular recess in the seal profile of the seal ring, the seal ring distal annular recess being spaced axially from the distal end of the seal ring, defining a metal-to-metal seal surface between the distal end of the seal ring and the seal ring distal annular recess that is positioned to engage the tubular member, the seal ring being configured to provide sufficient compressive force at the metal-to-metal seal surface to form a metal-to-metal seal against the tubular member;
a seal ring proximal annular recess in the seal profile of the seal ring and spaced axially from the seal ring distal annular recess, defining a support area axially spaced from the metal-to-metal seal surface;
the support area being positioned to contact the tubular member when exposed to a selected level of fluid pressure, but at a lesser compressive force than at the metal-to-metal seal surface and the tubular member;
a tubular member proximal annular recess that is opposite and aliens with the seal ring proximal annular recess; and wherein
the seal ring distal and proximal annular recesses have axial extent lengths that exceed an axial extent length of the metal-to-metal seal surface measured along the axis of the seal assembly.

* * * * *